May 17, 1955

H. CAREW 2,708,531

CUP-CARRYING STRUCTURE FOR A BULK BEVERAGE VENDING MACHINE

Filed Feb. 10, 1950

Inventor
Herman Carew

By [signature] Attys

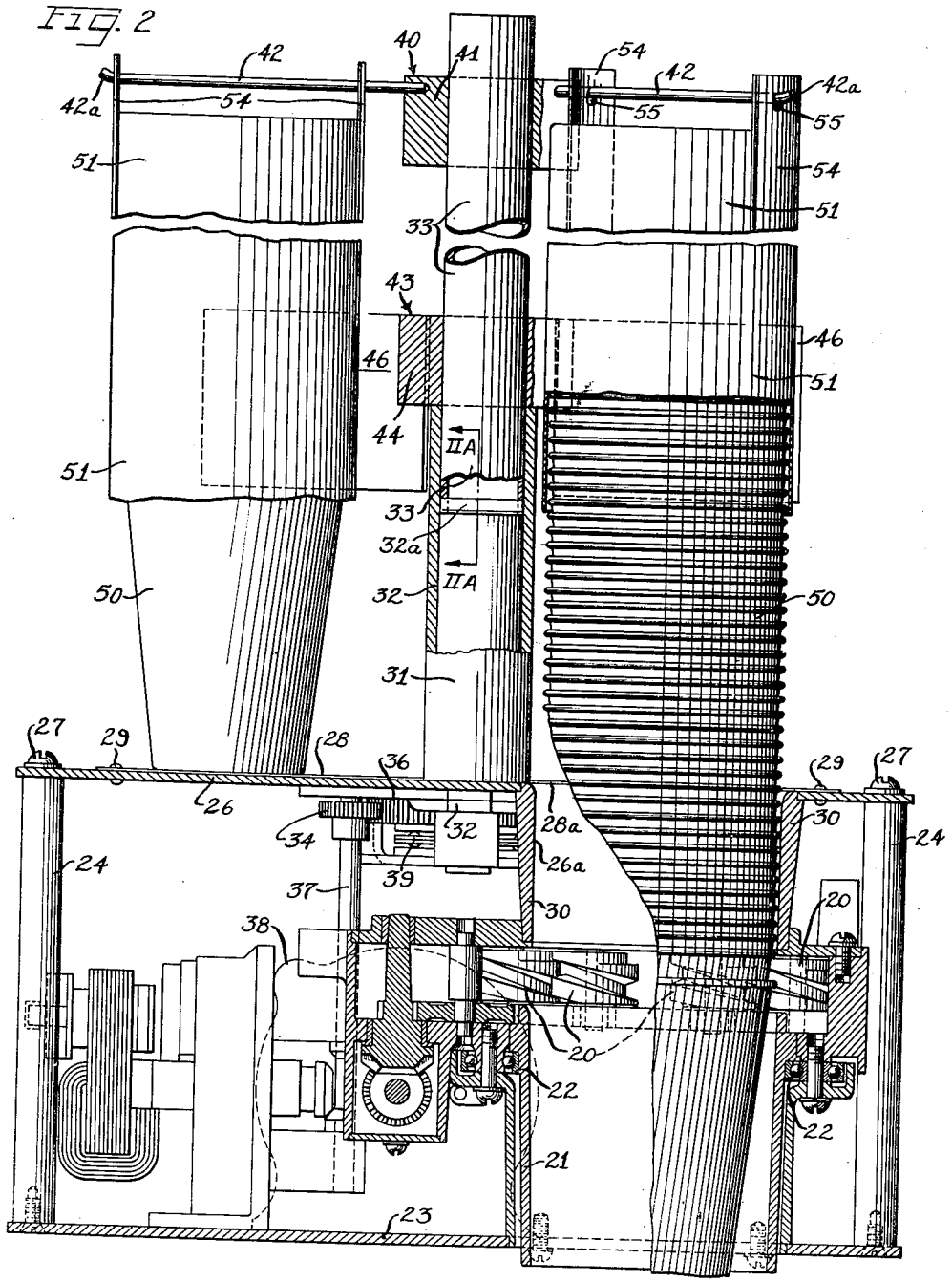

May 17, 1955

H. CAREW

CUP-CARRYING STRUCTURE FOR A BULK
BEVERAGE VENDING MACHINE

Filed Feb. 10, 1950

Inventor
Herman Carew

By [signature] Attys

May 17, 1955 H. CAREW 2,708,531
CUP-CARRYING STRUCTURE FOR A BULK
BEVERAGE VENDING MACHINE
Filed Feb. 10, 1950 5 Sheets-Sheet 4
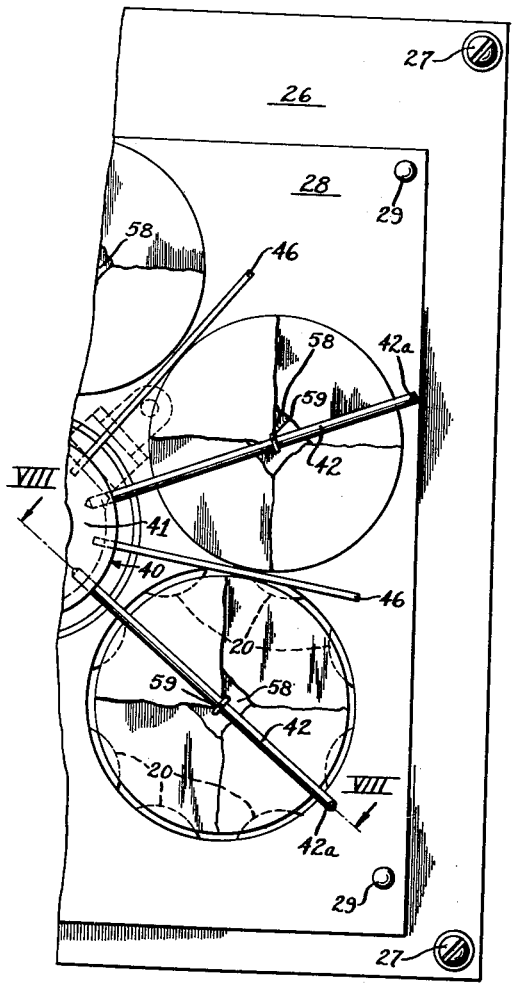
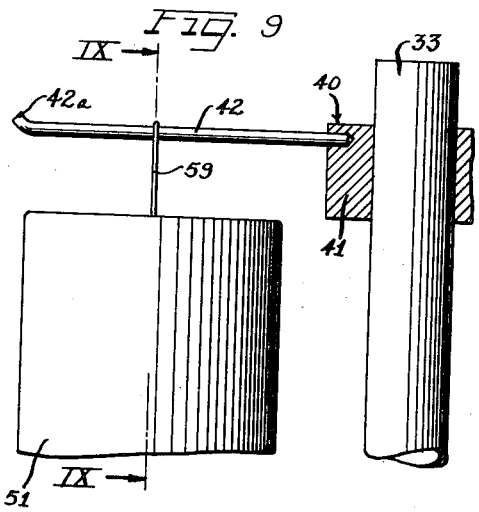
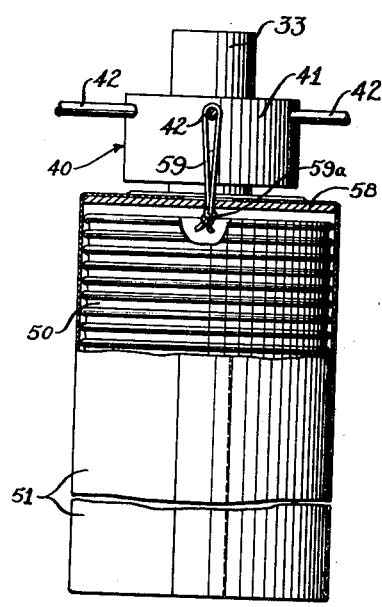
Inventor
Herman Carew
By Attys May 17, 1955
H. CAREW
2,708,531
CUP-CARRYING STRUCTURE FOR A BULK
BEVERAGE VENDING MACHINE
Filed Feb. 10, 1950
5 Sheets-Sheet 5
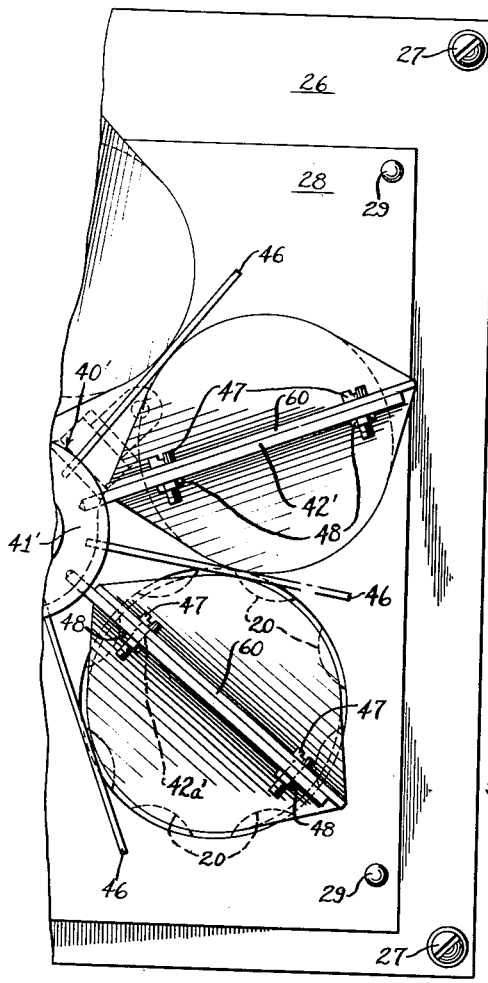
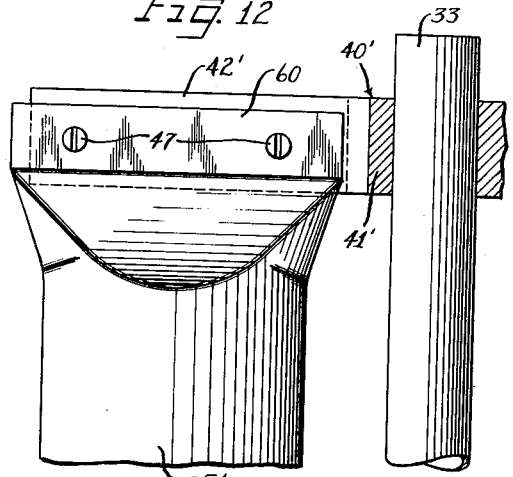
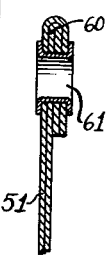
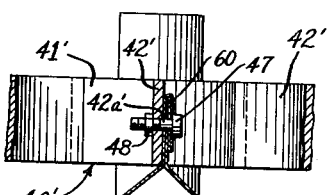
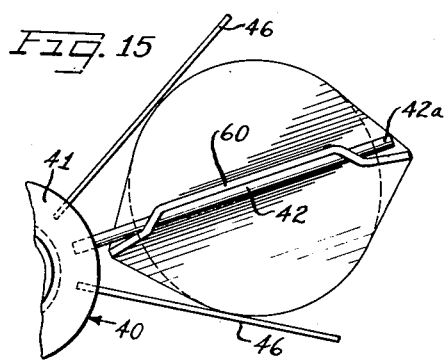
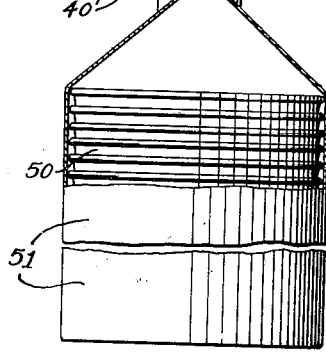
Inventor
Herman Carew
By The firm of Charles W. Hills Attys

United States Patent Office 2,708,531
Patented May 17, 1955

2,708,531

CUP-CARRYING STRUCTURE FOR A BULK BEVERAGE VENDING MACHINE

Herman Carew, Easton, Pa., assignor to Dixie Cup Company, Easton, Pa., a corporation of Delaware Application February 10, 1950, Serial No. 143,544

8 Claims. (Cl. 221—104)

This invention relates generally to bulk beverage vending machines and more particularly relates to a cup carrying mechanism employed in a vending apparatus and a magazine-type cartridge to be employed in connection with the cup-carrying mechanism.

Heretofore, vending receptacles such as paper cups and the like have been packaged in conventional cardboard cartons, each carton containing a stack of nested cups, and a number of such cartons were usually enclosed by a heavy corrugated casing for shipping purposes. The usual type of bulk beverage vending machine has included a rotating magazine in which a plurality of stacks of nested cups may be loaded.

Past practice has required that vending apparatus servicing personnel open the carton, extract the stack of nested cups, transfer the stack of cups to one of the receptacles in the rotating magazine and readjust the apparatus for subsequent operation.

The procedures outlined involved serious short-comings for a number of reasons.

The comparatively heavy cardboard containers, for example, are relatively expensive and are somewhat difficult to handle when the cups are being extracted therefrom because of their elongated configuration. Moreover, the disposal of the empty cardboard carton presents a serious problem. Vending machines are frequently located in confined spaces, for example, subway stations and theatre lobbies, where disposal means are not readily available. If disposal of the carton assumes the significance of a separate procedural operation, it will be readily appreciated that the cost of servicing the apparatus increases proportionately.

The rotating magazines heretofore provided have also been subject to criticism. Health authorities, particularly the health commissions of cities embodying a large metropolitan area, prescribe rigid specifications for bulk beverage vending machines in order to preclude the vending of contaminated receptacles to the public. It has frequently been necessary, as a matter of meeting hygienic standards, that the topmost cup of each stack in a cup-carrying magazine be destroyed due to the collection of dust and other contaminating foreign particles thereon. The construction and provision of magazines having permanent enclosures for the stacks of cups is not a satisfactory solution to this problem because of high manufacturing costs, inconvenience in servicing the vending apparatus, and inefficiency in operation.

Another significant factor may also be noted. The consuming public has developed what, for all practical purposes, amounts to a fetish with respect to the desirability of a coin-operated vending machine to be operated by a coin of five-cent denomination, the so-called nickel. In view of the firmly established status of the nickel, the comparatively high cost of vending apparatus and the rising cost of the ingredients used therein makes it absolutely essential that expenses be pared wherever possible.

According to the general features of the present invention, the heavy cardboard carton is completely eliminated and a tubularized wrapping of frangible paper is provided to snugly encase a stack of nested vending receptacles. The bottom portion of the tubularized wrapping or sleeve is stiffened, for example, by a cardboard disk, to close the end of the sleeve and to support the stack of receptacles when positioned uprightly. The other end of the sleeve is completely closed, thereby affording a dust-free casing which precludes contamination of the receptacles. Suspension means are defined by or attached to the upper portion of the sleeve, by means of which the sleeve, loaded with a stack of cups to form a cartridge, may be suspended.

A cup-carrying mechanism comprising a rotating stand having a spider with a plurality of radially extending spaced-apart arms is provided to eliminate the conventional type of multiple-cylinder magazine.

In servicing a vending apparatus according to the present invention, the cartridges are conveniently and quickly suspended from the projecting arms of the spider and the stiffened bottom portion of each cartridge is readily broken away from the frangible wrapping, thereby permitting the stack of cups to drop down and rest on a circular track having a cup delivery aperture therein while still enclosed by the remainder of the wrapping. Upon rotation of the spider and angular displacement of the cartridges, each successive stack of cups may be delivered to a cup dispensing mechanism situated subjacent the cup-carrying structure.

It is an object of this invention, therefore, to provide a cup-carrying arrangement for a bulk beverage vending machine which overcomes the deficiencies of the prior art.

Another object of the present invention is to provide a cup-carrying arrangement for a bulk beverage vending machine which may be economically and conveniently serviced with a simplified cartridge structure.

A further object of the present invention is to provide a cup-carrying mechanism for a bulk beverage vending machine apparatus which is made up of a reduced number of simplified elements which are economical to produce and particularly efficient for their intended purpose.

Yet another object of the present invention is to provide a novel and improved expendable cartridge for nested vending receptacles which may be incorporated as part of the cup-carrying structure in a bulk beverage vending machine.

A further object of the present invention is to provide a cartridge for a stack of vending receptacles which substantially encloses the receptacles in a dust-free casing.

A further object of the present invention is to provide a sanitary casing for a stack of vending receptacles which is convenient to handle and which may be incorporated as a part of a rotatable magazine in a bulk beverage vending machine.

Many other features, advantages and additional objects of the present invention will become manifest to those versed in the art upon making reference to the detailed description which follows and the accompanying sheets of drawings in which:

Figure 2 is a broken cross-sectional view with parts broken away and with parts shown in elevation taken on the line II—II of Figure 1;

Figure 8 is a fragmentary plan view of a cup-carrying mechanism loaded with an alternative form of vending receptacle according to the present invention;

Figure 9 is an enlarged fragmentary view taken on line VIII—VIII of Figure 8;

Figure 10 is a broken view substantially in elevation but with parts broken away and with parts shown in cross section taken on line IX—IX of Figure 9;

Figure 11 is a fragmentary plan view of an alternative form of cup-carrying mechanism according to the present invention loaded with another form of receptacle cartridge;

Figure 12 is a fragmentary elevational view with parts shown in cross section of one of the cartridges shown in Figure 11;

Figure 13 is an end view with parts broken away and with parts shown in cross section of the cartridge shown in Figure 11;

Figure 14 is an enlarged detail cross-sectional view showing an eyelet reinforcement for the suspension flap of the cartridge shown in Figures 12 and 13; and Figure 15 is a fragmentary plan view showing how the cartridge of Figures 11, 12 and 13 may be threaded onto the spider arm of the cup-carrying mechanism.

As shown on the drawings:

Although the present invention relates generally to bulk beverage dispensing apparatus, I have shown only as much of the mechanism as is necessary to gain a full understanding of the principles of the present invention.

Figure 1:
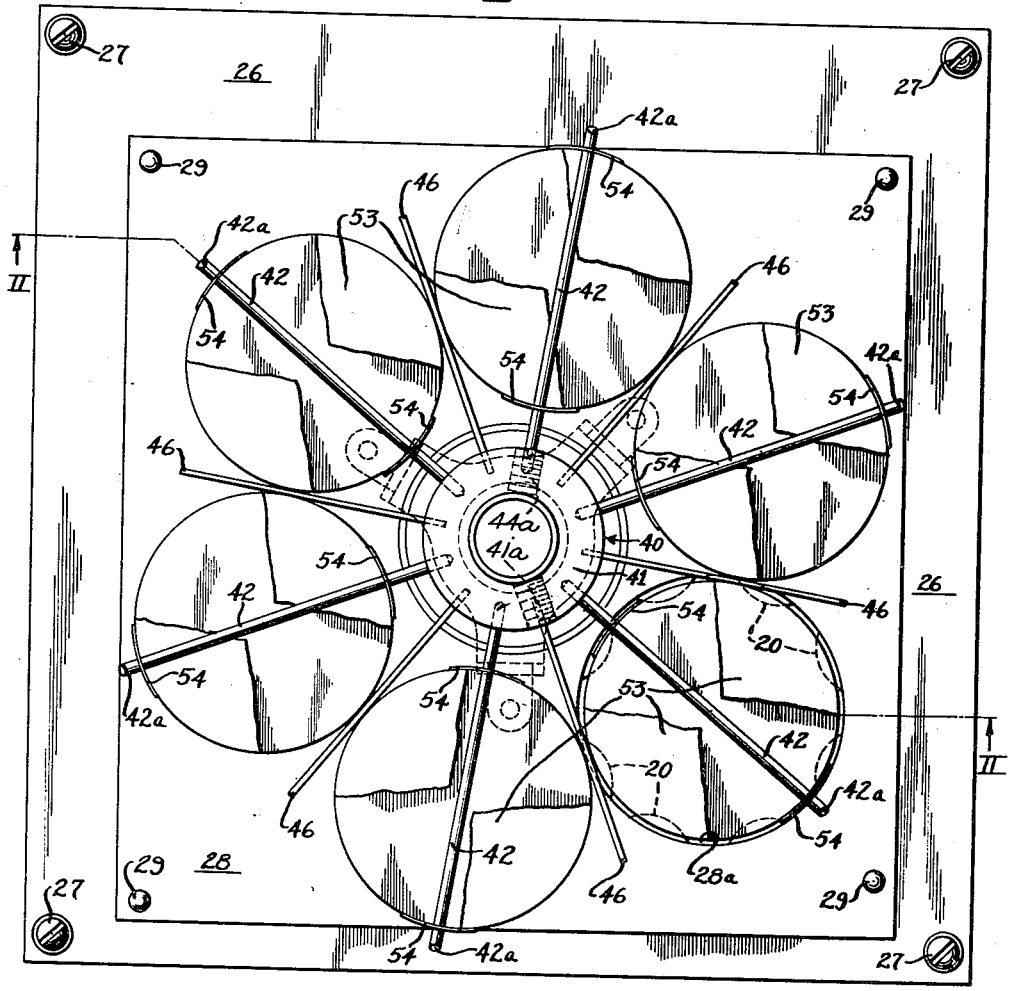
Figure 1 is a top plan view of a cup-carrying mechanism for a bulk beverage vending machine apparatus according to the present invention.
Figure 3:
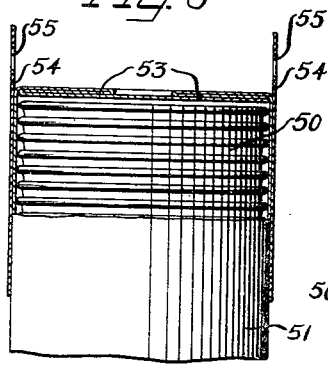
Figure 3 is a fragmentary elevational view with parts broken away and with parts shown in section of a receptacle cartridge according to the present invention.
Figure 4:
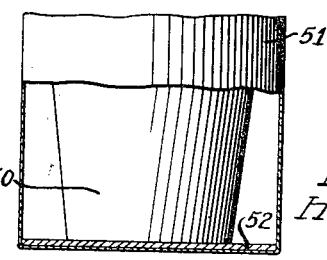
Figure 4 is a fragmentary detailed view with parts broken away and with parts shown in cross section of the bottom portion of the cartridge shown in Figure 3.
Figure 2A:
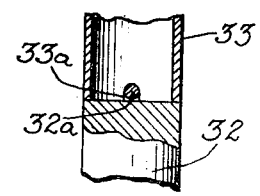
Figure 2A is a fragmentary vertical sectional view taken substantially as indicated by the section line IIA—IIA of Fig. 2.

Referring first to Figures 1 and 2, a cup-carrying mechanism is shown positioned generally superjacent a cup-dispensing mechanism which includes a circularly arranged series of cup-dispensing worms 20 designed to release a cup from a cup-holding station the instant the machine starts its cycle of operations and to effect delivery of another cup to the cup-holding station for a succeeding cycle of machine operations.

As the cups are released by the cup-dispensing mechanism, they drop through a rotary sleeve 21 and are located, as desired, in appropriate relationship to drink-dispensing means (not shown). A rotating sleeve 21 is journaled in a bearing 22 supported by other elements of a framing or base structure indicated generally by the reference numeral 23, the details of which not being necessary to the understanding of the principles of the present invention.

The framing structure 23 includes a plurality of posts 24 which carry a support plate 26 fastened to the posts by a plurality of fasteners 27. A plate-like element hereinafter referred to as a track 28 is fastened to one side of the support plate 26 by a plurality of fasteners 29.

The track 28 defines an aperture 28a and the support plate 26 defines an aperture 26a, both apertures together lying in registry with a guide tube 30 leading from the track 28 to the worms 20 of the cup-dispensing mechanism.

A housing 31, substantially centrally disposed relative to the track 28 and the support plate 26, projects upwardly and encloses a shaft 32 which has a reduced lower end extending through the track 28 and the support plate 26 and the upper end of which is drivingly connected to a hollow shaft 33 journaled in one end of the housing 31. As seen best in Fig. 2A a diametral pin 32a on top of the shaft 32 seats in opposed notches 33a in the hollow shaft 33.

The shaft 32 has a driven connection with a pinion 34 through a gear 36 firmly affixed thereto. The pinion 34 is turned by a shaft 37 operatively connected through a gear train to a motor 38, the motor 38 further providing the motive power for the worms 20 of the cup-dispensing mechanism as well as for the rotating sleeve 21. A suitable bearing structure 39 may also be provided for the shaft 32 to enhance the rotativity characteristics thereof.

The end of the hollow shaft 33 is characterized by the provision of a spider indicated generally by the reference numeral 40 which includes a body 41 held in place by a set screw 41a (Fig. 1) and from which projects a plurality of arms 42 spaced apart from one another in radially disposed array. Each of the arms 42 is essentially a rod-like element having a turned-up finger portion 42a on the end thereof.

A second spider 43 including a body 44 held in place by a set screw 44a (Fig. 1) and a plurality of radially spaced blades or vanes 46 is attached to the hollow shaft 33 at a point intermediate the spider 41 and the track 28. As will be noted upon Figure 2, the body 44 of the spider 43 preferably abuts the end of the housing 31, thereby serving to further support the hollow shaft 33 and stabilize the operation of the rotative assembly. Thus, what may well be termed a cup-handling skeleton turret is provided.

In Figures 11, 12 and 13, an alternative modification of the spider 40 is shown, such modification including a spider 40' which has a body 41' attached near the end of a hollow shaft 33 and carrying a plurality of radially projecting blade-like arms 42', each of said arms defining one or more apertures 42a' to receive fastening means therethrough. In the embodiment shown in the drawings, the apertures 42a' are unthreaded and the fastening means include a pair of machine bolts 47 which receive a pair of nuts 48 in threaded relation thereon.

According to the present invention, a novel magazine-type cartridge is provided to receive a stack of nested vending receptacles or paper cups 50. While several modifications of these cartridges are herein described for purposes of clarity, they are more fully set forth, described, and particularly claimed in a divisional application. Each of the cartridges includes a tubularized wrapping member of a frangible light-weight material, such as paper or the like, which peripherally engages a stack of nested cups 50 in rather snug relationship. The wrapping is indicated by the reference numeral 51 and, for the sake of convenience, may be referred to hereinafter as a sleeve.

Each of the sleeves 51 is preferably provided with a stiffened bottom portion which serves to close one end of the sleeve and to support the stack of cups 50 when the cartridge is positioned uprightly. The stiffened bottom portion may be conveniently formed by adhesively attaching a disk 52 made of some fairly rigid material, such as pressed paper or cardboard and the like, to the walls of the sleeve. As shown in the drawings, the walls of the sleeve 51 may be turned over around the edges of the disk 52 and bonded thereto by any suitable adhesive.

The top of each of the sleeves 51 is closed so as to preclude the entry of foreign particles into the stack of nested cups 50 which might result in the contamination thereof and a suspension means is connected to the upper end of the sleeve so that the loaded cartridge may be suspended from one of the arms 42 or 42' of the rotatable cup-carrying mechanism.

The present invention contemplates the provision of several alternative cartridge structures which vary in reference to the treatment of the upper portion of the sleeve 51.

In the embodiments of Figures 1, 2, 3 and 4, the upper wall portions of the sleeve 51 are folded over and bonded together by a suitable adhesive as at 53, thereby enclosing the stack of cups 50 in a dust-free casing. A plurality of tab-like ears 54 are attached to the sleeve 51, by means of which the cartridge may be suspended in a cup-carrying mechanism. In this particular embodiment, a pair of tab-like ears 54 are situated in diametrically opposed relationship on the sides of a sleeve 51 and are attached thereto by means of a suitable adhesive. The ears 54 are each provided with an appropriate aperture 55 and the cartridge may be readily suspended from the spider 40 merely by threading one of the arms 42 through the apertured ears 54.

In order to permit delivery of cups from the supply represented by the stack of cups 50, servicing personnel engaged in loading the arms 42 of the cup-carrying mechanism may force the stiffened bottom portion of the sleeve or disk 52 downwardly with a thrust component of predetermined quantitative value in order to rupture the frangible side walls of the sleeve 51. This may be done with ease and convenience merely by tearing off the bottom of the casing.

After removal of the disk 52, the stack of cups 50 will drop down and rest upon the track 28 as shown in Figure 2. Subsequent angular displacement of the cartridges upon rotation of the cup-carrying mechanism through the hollow shaft 33 and the shaft 32 will place the cartridges in selective registry with the apertures 28a and 26a and the guide tube 30, whereupon the stacks of cups 50 will be selectively introduced into the cup-dispensing mechanism.

It may be noted that vending receptacles, particularly paper cups, are usually nested in such close relationship that the stack of cups comprises a comparatively solid slug-like mass, hence, the frangible wrapping comprising the sleeve 51 will be completely adequate insofar as its dust-free enclosure function is concerned even though the stacks of cups 50 are angularly displaced along the track 28. Moreover, the substantial nature of the slug-like mass of cups facilitates the sliding movement thereof whenever the spider 40 is rotated by the shaft 33.

The blades or vanes 46 of the spider 43 are provided, however, and serve to further augment the angular displacement of the cartridges and to separate the cartridges one from the other.

Figure 5:
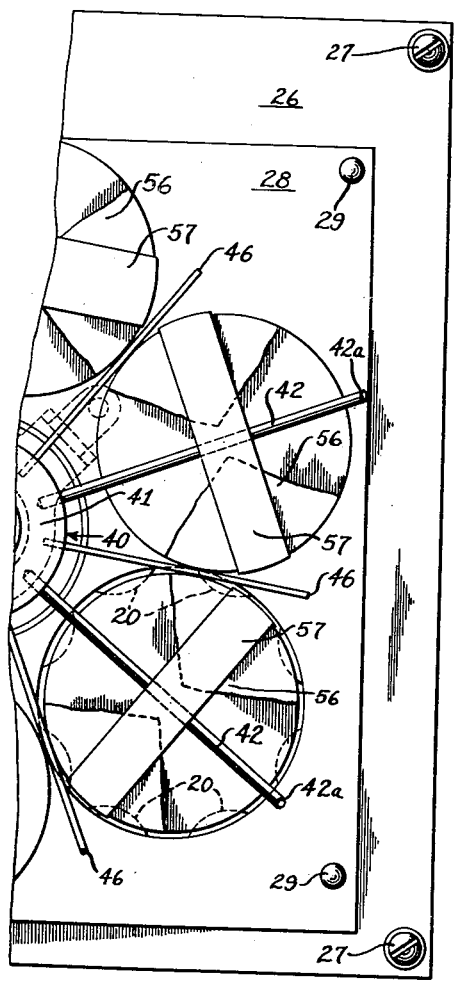
Figure 5 is a fragmentary plan view of a cup-carrying mechanism according to the present invention loaded with an alternative form of receptacle cartridge.
Figure 6:
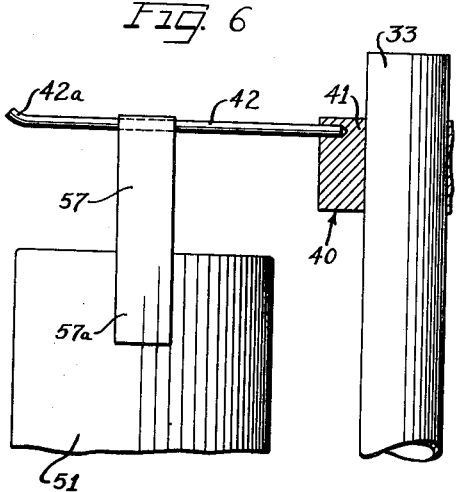
Figure 6 is a fragmentary side elevational view showing one of the cartridges suspended on a spider arm of the structure shown in Figure 5.
Figure 7:
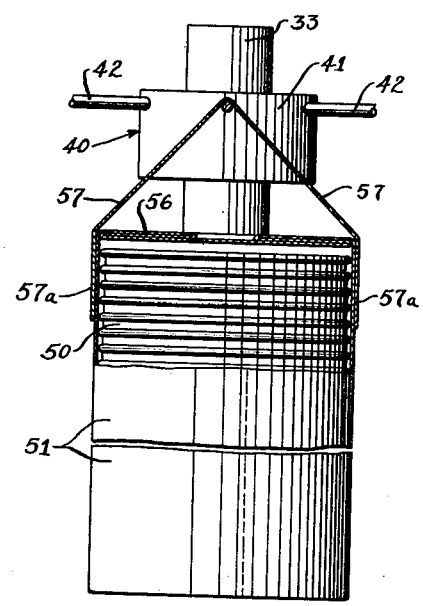
Figure 7 is a broken elevational view with parts broken away and with parts shown in cross section of the structure shown in Figure 5.

In the embodiment of Figures 5, 6 and 7, the upper wall portions of the sleeve 51 are folded over and bonded together by a suitable adhesive as at 56, thereby providing a dust-tight enclosure for the stack of cups 50. The suspension means takes the form of a strap 57 having both of its free ends 57a fastened to the sleeve 51 near the top thereof by a suitable adhesive. The strap 57 extends beyond the top of the cartridge to define a loop which receives a support member such as one of the arms 42.

In the embodiment of Figures 8, 9 and 10, the sleeve is further provided with a stiffened top portion to close the top end of the sleeve 51 and from which the cartridge may be suspended.

The stiffened top portion of the sleeve 51 is conveniently constructed by inserting a stiffened disk 58 made of pressed paper or cardboard or the like into the open end of the sleeve 51 and folding the end wall portions thereof around the edges of the disk for attachment thereto by a suitable adhesive.

The disk 58 may be provided with a suitable centrally disposed aperture through which a looped string 59 may be extended. The looped string 59 may be knotted as at 59a to preclude passage thereof through the disk aperture and projects above the disk a sufficient amount to freely receive a support element such as an arm 42 therethrough.

In the embodiment of Figures 11 through 15, the walls of the sleeve are flattened into abutting engagement and are adhesively integrated with one another to form a flap 60, the flap 60 being folded back upon itself to form a reinforced suspension flange.

By provision of the flap 60, the sleeve is sealed against the entry of foreign particles, thereby precluding contamination of the stack of nested cups, and the flap 60 further serves as an integral suspension means of which the cartridge may be carried by a cup-carrying mechanism.

To facilitate loading of cartridges such as those provided with a flap 60, the flap 60 may be provided with a pair of spaced apertures to pass the bolts 47 therethrough, thereby permitting easy attachment of the cartridge to the arm 42' of the spider 40' near the end of the shaft 33.

It will be apparent that the flap 60 may also be easily assembled on an arm 42 of the spider 40 merely by threading the arm 42 through the spaced apertures as is shown on Figure 14.

It will be appreciated that the edges of the apertures formed in the flap 60 may be reinforced, if desired, by appropriate eyelets 61, as shown in Figure 14.

In practice, the servicing of a vending apparatus according to the teachings of the present invention is greatly simplified. The servicing operator need merely transport the encased stacks of cups in appropriate cartridge form as described above to the locale of the apparatus and the casing may be readily suspended from the projecting arms of the rotatable spider. After hanging each casing on an appropriately projecting arm, the servicing operator need only insert his thumb nail above the cardboard disk near the bottom of the cartridge and make a simple downward tearing movement to rupture the frangible side walls of the sleeve near the bottom thereof, thereby permitting the encased cups to fall on the track. Rotation of the cartridges into selective registry with the cup-dispensing mechanism is effected by automatic operation of the vending apparatus.

While it is conceivable that various modifications might be suggested to a person skilled in the art to the preferred embodiments herein shown and described in considerable detail for the sake of clarity, it should be understood that I wish to embody within the scope of this patent all such embodiments as reasonably and properly come within the scope of my contribution to the art.

I claim as my invention:

1. In a cup-handling mechanism of a vending machine, a rotatable supporting stand, a plurality of radially spaced spoke-like projections on an upper portion of the stand, a support plate spaced away from said projections, a plurality of vending receptacle cartridges, each cartridge comprising a frangible casing peripherally engaging a stack of nested receptacles with suspension means near the top of the casing, each of said cartridges suspended from one of said projections, and means to selectively rotate said stand, said means including a plurality of radially spaced blades intermediate the projections and the support plate to separate the cartridges and assist in the rotation of the cartridges when the stand is rotated.

2. In a cup-carrying arrangement for a vending machine, a support plate, a rotatable shaft projecting upwardly through the support plate, means to rotate the shaft, a spider on the end of the shaft defining a plurality of radially projecting spaced-apart arms, a plurality of cup-carrying cartridges, each cartridge having a frangible tubularized sleeve encasing a stack of nested cups with a closed top portion, a stiffened bottom cup-supporting portion, suspension means to effect suspension of the cartridge from one of said arms, said stiffened body portion being readily broken from the frangible sleeve to permit the stack of encased cups to feed out of the open sleeve bottom and rest on the support plate, and said support plate having an opening successively registrable with the respective stacks of cups upon rotation of the shaft.

3. In a cup-handling apparatus for a vending machine, a rotary skeleton turret including spoke-like arms at the upper part thereof, a flat track below said turret and having an opening therein through which cups may drop when in registry therewith, a cartridge for a stack of cups suspended from each of said arms and comprising a frangible temporary casing surrounding the stack of cups, said cups resting on said track when the bottom of said frangible casing is removed leaving only the casing depending from the respective arm, and means to selectively rotate said turret to bring stacks of cups successively over said opening.

4. In a cup-handling apparatus for a vending machine, a rotary skeleton turret including spoke-like arms at the upper part thereof, a flat track below said turret and having an opening therein through which cups may drop when in registry therewith, a cartridge for a stack of cups suspended from each of said arms and comprising a frangible temporary casing surrounding the stack of cups, said cups resting on said track when the bottom of said frangible casing is removed leaving only the casing depending from the respective arm, radially extending vanes on said turret intermediate said arms and said track each of which extends between adjacent frangible casings, and means to rotate said turret to bring stacks of cups successively into registry with said opening.

5. In cup-handling apparatus, an upright rotary shaft, means to rotate said shaft at intervals, spaced laterally extending arms projecting from the upper part of said shaft, a track having an opening therein through which cups may gravitate, stacks of nested cups resting on said track for successive movement into registry with said opening, and a frangible casing depending from each of said arms and embracing a stack of cups whereby said cups are maintained sanitary at all times until they pass through said opening.

6. In cup-handling apparatus, an upright rotary shaft, means to rotate said shaft at intervals, spaced laterally extending arms projecting from the upper part of said shaft, a track having an opening therein through which cups may gravitate, stacks of nested cups resting on said track for successive movement into registry with said opening, a frangible casing depending from each of said arms and embracing a stack of cups whereby said cups are maintained sanitary at all times until they pass through said opening, and stabilizing means on said shaft to steady the cup stacks when moving over said track.

7. In cup-handling apparatus, an upright rotary shaft, means to rotate said shaft at intervals, spaced laterally extending arms projecting from the upper part of said shaft, a track having an opening therein through which cups may gravitate, stacks of nested cups resting on said track for successive movement into registry with said opening, and an open-bottomed paper temporary sleeve suspended from each said arm to embrace a stack of cups to maintain said cups sanitary at all times.

8. In cup-handling apparatus, an upright rotary shaft, means to rotate said shaft at intervals, spaced laterally extending arms projecting from the upper part of said shaft, a track having an opening therein through which cups may gravitate, stacks of nested cups resting on said track for successive movement into registry with said opening, an open-bottomed paper temporary sleeve suspended from each said arm to embrace a stack of cups to maintain said cups sanitary at all times, and a plurality of laterally extending blades each projecting from said shaft between adjacent stacks of cups to stabilize the same when moving over said track.

References Cited in the file of this patent

UNITED STATES PATENTS

| | | |
|---|---|---|
| 1,709,495 | Smethers et al. | Apr. 16, 1929 |
| 1,743,092 | Bereck | Jan. 14, 1930 |
| 1,809,691 | Gregory | June 9, 1931 |
| 2,278,013 | Nicholson | Mar. 31, 1942 |
| 2,340,089 | Vineburgh | Jan. 25, 1944 |
| 2,340,090 | Vineburgh | Jan. 25, 1944 |
| 2,394,262 | Reifsnyder et al. | Feb. 5, 1946 |